US012687758B2

(12) United States Patent　　(10) Patent No.:　US 12,687,758 B2

Kim et al.　　(45) Date of Patent:　Jul. 21, 2026

(54) SPATIAL LIGHT MODULATOR, ELECTRONIC APPARATUS INCLUDING THE SPATIAL LIGHT MODULATOR, AND METHOD OF FABRICATING THE SPATIAL LIGHT MODULATOR

(71) Applicant: SAMSUNG ELECTRONICS CO., LTD., Suwon-si (KR)

(72) Inventors: Sunil Kim, Suwon-si (KR); Byonggwon Song, Suwon-si (KR); Minkyung Lee, Suwon-si (KR); Byunggil Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 245 days.

(21) Appl. No.: 18/776,845

(22) Filed: Jul. 18, 2024

(65) Prior Publication Data

US 2025/0224650 A1　　Jul. 10, 2025

(30) Foreign Application Priority Data

Jan. 9, 2024　(KR) ......................... 10-2024-0003846

(51) Int. Cl.
G02F 1/29　　(2006.01)

(52) U.S. Cl.
CPC .......... G02F 1/292 (2013.01); G02F 2203/24 (2013.01)

(58) Field of Classification Search
CPC ....................................................... G02F 1/292
See application file for complete search history.

(56) References Cited

U.S. PATENT DOCUMENTS

| | | | |
|---|---|---|---|
| 8,111,445 B2 | 2/2012 | Chui et al. | |
| 2006/0033980 A1* | 2/2006 | Wagner .................. | G02B 7/181 |
| | | | 359/291 |
| 2010/0253677 A1 | 10/2010 | Kroll et al. | |
| 2014/0065785 A1 | 3/2014 | Yoon et al. | |
| 2018/0196138 A1* | 7/2018 | Lee ........................... | G02F 1/21 |
| 2023/0123994 A1 | 4/2023 | Lee et al. | |
| 2023/0176445 A1 | 6/2023 | Jeong et al. | |
| 2024/0201557 A1 | 6/2024 | Kim et al. | |

FOREIGN PATENT DOCUMENTS

| | | |
|---|---|---|
| KR | 10-2016-0124921 A | 10/2016 |
| KR | 10-1934093 B1 | 1/2019 |
| KR | 10-2023-0055989 A | 4/2023 |
| KR | 10-2023-0086505 A | 6/2023 |
| WO | WO 2010082542 A1 * | 7/2010 |

* cited by examiner

*Primary Examiner* — James A Dudek

(74) *Attorney, Agent, or Firm* — Sughrue Mion, PLLC

(57) ABSTRACT

A spatial light modulator for modulating a phase of incident light and emitting phase-modulated light includes a substrate, a plurality of pixels, and a void block layer. Each pixel of the plurality of pixels includes an upper reflective layer, a lower reflective layer, and a cavity layer disposed between the upper reflective layer and the lower reflective layer and having a refractive index that changes based on an electrical signal. The void block layer includes a plurality of pillars supporting the plurality of pixels and separating the plurality of pixels from the substrate, and void regions formed between the substrate and the plurality of pixels.

20 Claims, 13 Drawing Sheets

SPATIAL LIGHT MODULATOR, ELECTRONIC APPARATUS INCLUDING THE SPATIAL LIGHT MODULATOR, AND METHOD OF FABRICATING THE SPATIAL LIGHT MODULATOR

CROSS-REFERENCE TO RELATED APPLICATIONS

This application claims benefit of priority under 35 U.S.C. § 119 to Korean Patent Application No. 10-2024-0003846, filed on Jan. 9, 2024, in the Korean Intellectual Property Office, the disclosure of which is incorporated by reference herein in its entirety.

BACKGROUND

1. Field

The present disclosure relates generally to light modulators, and particularly, to a spatial light modulator, an electronic apparatus including the spatial light modulator, and a method of fabricating the spatial light modulator.

2. Description of Related Art

A method of mechanically rotating a laser irradiation portion and/or a method of using an optical phased array (OPA) may be used to steer a laser beam to a desired position. Recently, a method of using an OPA may have gained in attention. The method of using an OPA may refer to steering a laser beam by modulating a phase of a laser beam incident on a spatial light modulator and emitting the phase-modulated laser beam. Beam steering devices using an OPA may be applied to various fields, such as, but not limited to, light detection and ranging (LiDAR), three-dimensional (3D) depth cameras that may obtain distance information for each direction, and the like.

When a spatial light modulator is driven, heat may be generated in the driven pixels. However, the heat generated by the driven pixels may affect non-driven pixels, which may affect the operation of the spatial light modulator.

SUMMARY

One or more example embodiments of the present disclosure provide a spatial light modulator with reduced thermal interference between pixels, when compared to a related spatial light modulator.

Further, one or more example embodiments of the present disclosure provide a spatial light modulator with reduced power consumption, when compared to a related spatial light modulator.

According to an aspect of the present disclosure, a spatial light modulator for modulating a phase of incident light and emitting phase-modulated light includes a substrate, a plurality of pixels, and a void block layer. Each pixel of the plurality of pixels includes an upper reflective layer, a lower reflective layer, and a cavity layer disposed between the upper reflective layer and the lower reflective layer and having a refractive index that changes based on an electrical signal. The void block layer includes a plurality of pillars supporting the plurality of pixels and separating the plurality of pixels from the substrate, and void regions formed between the substrate and the plurality of pixels.

In an embodiment, the void regions may be substantially a vacuum.

In an embodiment, the void block layer may further include a support layer apart from the substrate and supporting the plurality of pixels. The plurality of pillars may be disposed between the substrate and the support layer.

In an embodiment, each of the void regions has a thickness of 1 micrometer (μm) to 10 μm.

In an embodiment, a gap between the plurality of pillars may be 1 μm to 10 μm.

In an embodiment, each of the plurality of pillars may have a width of 0.1 μm to 1 μm.

In an embodiment, the spatial light modulator may further include a planarization layer disposed between the plurality of pixels and the void block layer.

In an embodiment, the void block layer may further include a support layer apart from the substrate and the plurality of pillars. The plurality of pillars may be arranged between the substrate and the support layer. The planarization layer may be disposed on the support layer.

In an embodiment, the planarization layer and the void block layer may include a same material.

In an embodiment, the spatial light modulator may further include a trench formed between two adjacent pixels of the plurality of pixels.

In an embodiment, the trench may pass through the void block layer.

In an embodiment, the lower reflective layer may include at least one of a metal mirror layer or a distributed Bragg reflector.

In an embodiment, the upper reflective layer may include a distributed Bragg reflector.

In an embodiment, the upper reflective layer may include a high contrast grating (HCG) layer.

According to an aspect of the present disclosure, a method of fabricating a spatial light modulator includes sequentially forming, on a substrate, a void block layer, a lower reflective layer, a cavity layer, and an upper reflective layer. The forming of the void block layer includes forming a sacrificial layer on the substrate, forming a plurality of through-holes exposing a surface of the substrate by etching the sacrificial layer, forming a plurality of pillars by filling the plurality of through-holes with a support material, and removing the sacrificial layer.

In an embodiment, the forming of the void block layer may further include at least partially covering a surface of the sacrificial layer by forming the support material, and forming, on the surface of the sacrificial layer, a first support material layer supported on the substrate by the plurality of pillars.

In an embodiment, the removing of the sacrificial layer may include forming a hole in the first support material layer and removing the sacrificial layer by etching the sacrificial layer through the hole.

In an embodiment, the forming of the void block layer may further include forming a second support material layer on the first support material layer, and forming a support layer supporting the lower reflective layer by forming the first support material layer and the second support material layer.

In an embodiment, the first support material layer and the second support material layer may include a same material.

According to an aspect of the present disclosure, an electronic apparatus includes a light source configured to emit light of a wavelength, and a spatial light modulator configured to modulate a phase of light incident from the light source and emit phase-modulated light. The spatial light modulator includes a substrate, a plurality of pixels, and a void block layer. Each pixel of the plurality of pixels includes an upper reflective layer, a lower reflective layer, and a cavity layer disposed between the upper reflective layer and the lower reflective layer and having a refractive index that changes based on an electrical signal. The void block layer includes a plurality of pillars supporting the plurality of pixels and separating the plurality of pixels from the substrate, and void regions formed between the substrate and the plurality of pixels.

According to an aspect of the present disclosure, an electronic apparatus may include: a light source configured to emit light; and a spatial light modulator configured to modulate a phase of light incident from the light source and emit phase-modulated light, wherein the spatial light modulator may include: a substrate; a plurality of pixels; and a void block layer provided on the substrate and between the substrate and the plurality of pixels, and comprising a support structure that has a fill factor less than 20% and a thermal conductivity less that a thermal conductivity of the substrate.

The support structure comprises a plurality of pillars, and each pixel of the plurality of pixels may include: an upper reflective layer; a lower reflective layer; and an active layer disposed between the upper reflective layer and the lower reflective layer and having a refractive index that changes based on an electrical signal applied to the active layer.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the disclosure may be more apparent from the following description taken in conjunction with the accompanying drawings, in which.

DETAILED DESCRIPTION

Figure 1:
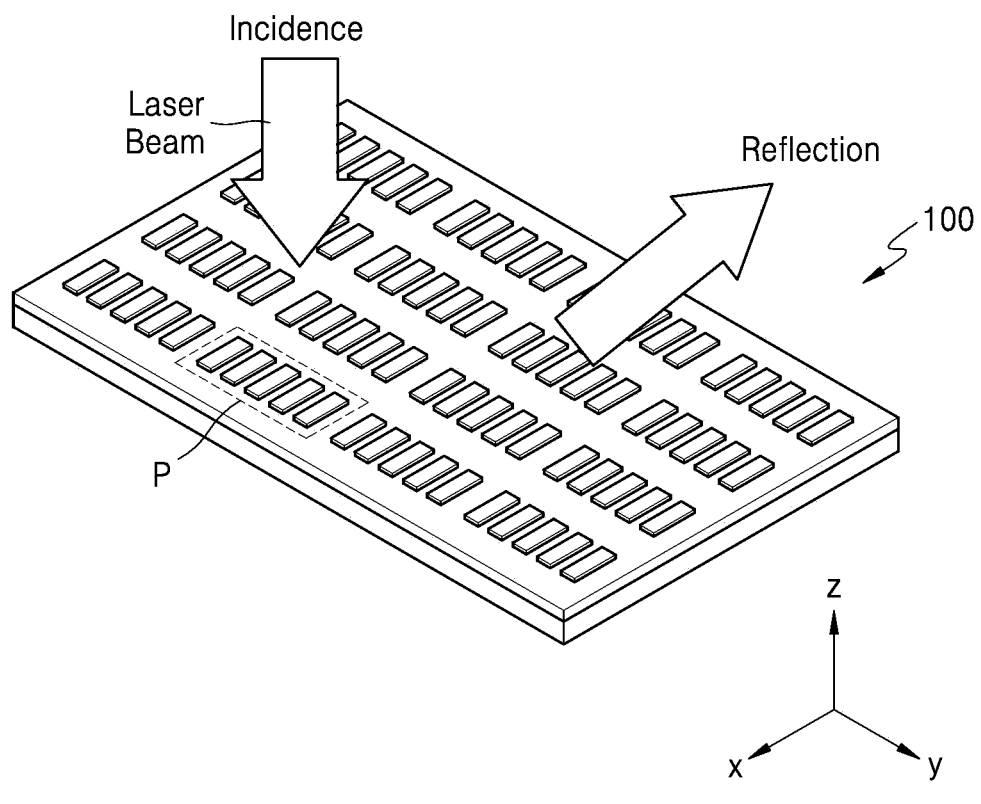
FIG. 1 is a schematic perspective view of a spatial light modulator, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments are described with reference to the accompanying drawings. In the following drawings, the size of each element in the drawings may be exaggerated for clarity and convenience of explanation. Embodiments described herein are merely examples and various modifications may be made thereto from these embodiments.

Hereinafter, the terms "above" or "on" may include not only those that are directly above, below, left, or right in a contact manner, but also those that are above, below, left, or right in a non-contact manner. The singular forms as used herein are intended to include the plural forms as well unless the context clearly indicates otherwise. It is to be understood that the terms "comprise," "include," or "have" as used herein specify the presence of stated elements, but do not preclude the presence or addition of one or more other elements.

The use of the term "the" and similar demonstratives may correspond to both the singular and the plural. Operations constituting methods may be performed in any suitable order unless otherwise indicated herein or otherwise clearly contradicted by context, and are not necessarily limited to the stated order.

Also, the terms such as "unit" and "module" described in the specification mean units that process at least one function or operation, and may be implemented as hardware, software, or a combination of hardware and software.

Connecting lines or connecting members illustrated in the drawings are intended to represent exemplary functional relationships and/or physical or logical connections between the various elements. It should be noted that many alternative or additional functional relationships, physical connections or logical connections may be present in a practical device.

The use of all illustrations or illustrative terms in the embodiments is simply to describe the technical ideas in detail, and the scope of the present disclosure is not limited by the illustrations or illustrative terms unless they are limited by claims.

As used herein, when an element or layer is referred to as "covering", "overlapping", or "surrounding" another element or layer, the element or layer may cover at least a portion of the other element or layer, where the portion may include a fraction of the other element or may include an entirety of the other element. Similarly, when an element or layer is referred to as "penetrating" another element or layer, the element or layer may penetrate at least a portion of the other element or layer, where the portion may include a fraction of the other element or may include an entire dimension (e.g., length, width, depth) of the other element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

As used herein, each of the terms "$Al_2O_3$", "AZO", "GIZO", "GZO", "$HfO_2$", "ITO", "IWO", "IZO", "$Si_3N_4$", "$SiN_x$", "$SiO_2$", "$TiO_2$", and the like may refer to a material made of elements included in each of the terms and is not a chemical formula representing a stoichiometric relationship.

Hereinafter, various embodiments of the present disclosure are described with reference to the accompanying drawings.

FIG. 1 is a schematic perspective view of a spatial light modulator 100, according to an embodiment. Referring to FIG. 1, the spatial light modulator 100 configured to modulate a phase of incident light and emit the phase-modulated incident light is illustrated. The spatial light modulator 100 may include a plurality of pixels P arranged in a certain form. The plurality of pixels P may be arranged in a one-dimensional (1D) or two-dimensional (2D) form. A refractive index of each of the plurality of pixels P may change according to an independently applied voltage, and thus, the phase of incident light (e.g., laser beam) may be modulated. Accordingly, the plurality of pixels P constituting the spatial light modulator 100 may form a phase profile. By controlling the phase profile, beam steering may be performed to emit light incident on the spatial light modulator 100 in a desired direction. The light incident on the spatial light modulator 100 may have a wavelength of, for example, about 900 nanometers (nm) to about 1,000 nm. Although FIG. 1 illustrates a case where the spatial light modulator 100 is a reflective spatial light modulator, the present disclosure is not limited thereto. For example, the spatial light modulator 100 may be and/or may include a transmissive spatial light modulator.

Figure 2:
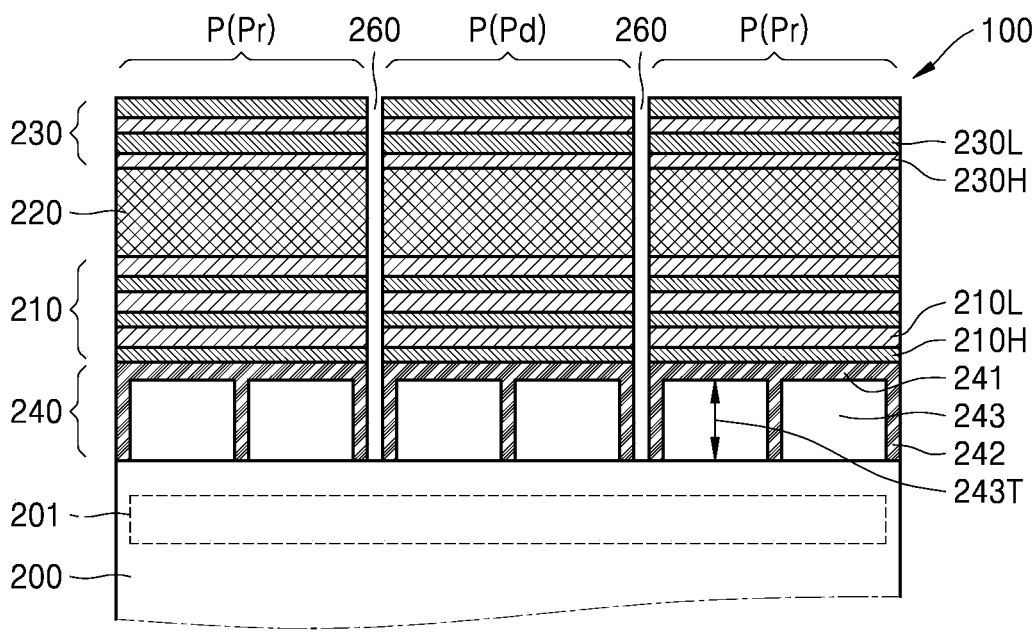
FIG. 2 is a schematic cross-sectional view of a spatial light modulator, according to an embodiment.

FIG. 2 is a schematic cross-sectional view of a spatial light modulator 100, according to an embodiment. Referring to FIG. 2, the spatial light modulator 100 may include a substrate 200, a plurality of pixels P forming a phase profile according to a change in refractive index, and a void block layer 240 forming void regions 243 between the substrate 200 and the plurality of pixels P.

The substrate 200 may be a semiconductor substrate, for example, a silicon (Si) substrate, however, the present disclosure is not limited thereto. The thickness of the substrate 200 may be determined considering several factors. For example, the thickness of the substrate 200 may be determined considering a form factor and/or heat emission when applying the spatial light modulator 100 to a product.

A circuit module 201 that drives and controls the spatial light modulator 100 may be provided in the substrate 200. In an embodiment, the circuit module 201 may be provided in a region of the substrate 200 other than a region where the plurality of pixels P are formed. The circuit module 201 may be implemented in the form of a chip and may be connected to the plurality of pixels P by electric wires. As shown in FIG. 2, the plurality of pixels P may include one or more driven pixels Pd that are driven by the circuit module 201 and one or more non-driven pixels Pr.

The void block layer 240 that forms the void regions 243 between the substrate 200 and the plurality of pixels P may be arranged on the substrate 200. In an embodiment, the void block layer 240 may include a plurality of pillars 242 that support the plurality of pixels P so that the plurality of pixels P are spaced apart (e.g., separated) from the substrate 200. That is, the plurality of pixels P may be apart from one side of the substrate 200 (e.g., the top surface of the substrate 200) by the pillars 242, and the void regions 243 may be formed between the substrate 200 and the plurality of pixels P. The void regions 243 may be substantially a vacuum. In an embodiment, the void block layer 240 may include a support layer 241 that is apart from the substrate 200 and supports the plurality of pixels P. The support layer 241 may be, for example, a flat layer having a certain thickness. The pillars 242 may be arranged between the substrate 200 and the support layer 241 and may support the support layer 241. Accordingly, the void regions 243 may be formed between the support layer 241 and the substrate 200. A fill factor of the void region 243 may be, for example, about 50% to about 90%. For example, a fill factor of the void region 243 may be greater than or equal to about 80%. The void block layer 240 may include, for example, silicon oxide ($SiO_2$), silicon nitride ($SiN_x$), or the like. However, the present disclosure is not limited in this regard, and the void block layer 240 may include other materials. For example, the void block layer 240 may include any material with a lower heat transfer rate and/or lower thermal conductivity than the materials in the substrate 200 to reduce heat transfer from one pixel to an adjacent pixel through the lower portion (e.g., the substrate and the void block layer 240) of the pixels. In addition, the void region 243 may include a support structure (e.g., pillars) with a fill factor less than a predetermined value (e.g., 20%) or within a predetermined range (e.g., from 10% to 20%), and a void region (e.g., the void regions 243 having the fill factor of 50%-90% or 80% or more) within the support structure may be maintained in a vacuum state, to prevent or minimize heat transfer.

In an embodiment, a thickness 243T of the void region 243 may be, for example, about 1 micrometer (μm) to about 10 μm. When the thickness of the void region 243 is less than 1 μm, heat transfer from the plurality of pixels P to the substrate 200 through the pillars 242 may not be sufficient. When the thickness of the void region 243 is greater than 10 μm, a width (e.g. width 242W of FIG. 3) of the pillar 242 may need to be formed sufficiently large to provide sufficient structural rigidity, or a gap (e.g., gap 242G of FIG. 3) between the pillars 242 may need to be sufficiently small. Accordingly, an effective fill factor of the void region 243 greater than or equal to 50% (e.g., greater than or equal to 80%) may be challenging to achieve and/or heat transfer from the plurality of pixels P to the substrate 200 through the pillars 242 may not be sufficient.

Figure 3:
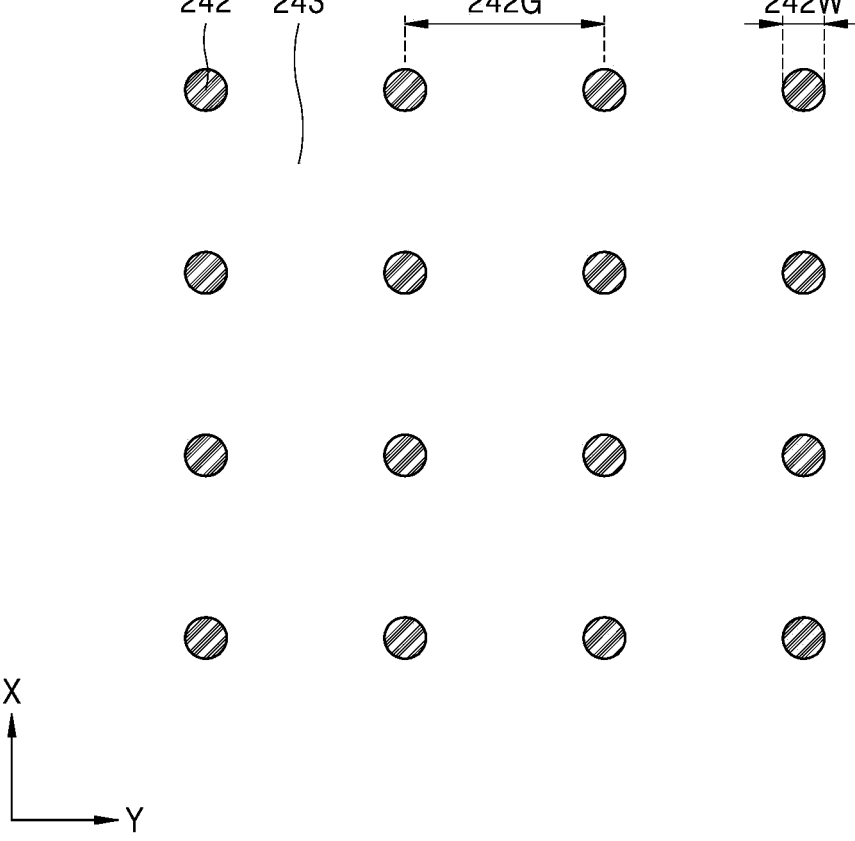
FIG. 3 is a schematic plan view of a plurality of pillars, according to an embodiment.

In an embodiment, the pillars 242 may have a shape of pillars apart from each other. The void regions 243 may communicate with each other. FIG. 3 is a schematic plan view of an embodiment of the pillars 242. Referring to FIG. 3, the cross-sectional shape of each of the pillars 242 is circular. However, the present disclosure is not limited in this regard, and the pillars 242 may have other shapes. The gap 242G between the pillars 242 and the width 242W of the pillars 242 may be appropriately determined considering the fill factor of the void region 243, the structural rigidity of the pillars 242, and the amount of heat transfer through the pillars 242. For example, the gap 242G between the pillars 242 may be about 1 μm to about 10 μm, and the width 242W of the pillars 242 may be about 0.1 μm to about 10 μm. When the gap 242G between the pillars 242 is relatively small (e.g., the gap 242G is less than 1 μm), the number of pillars 242 increases. Consequently, an effective fill factor of the void region 243 greater than or equal to 50% (e.g., 80% or more) may be challenging to achieve and/or heat transfer from the plurality of pixels P to the substrate 200 through the pillars 242 may not be sufficient. Similarly, when the width 242W of the pillars 242 is relatively large (e.g., the width 242W is greater than 1 μm), an effective fill factor of the void region 243 may be challenging to achieve and/or heat transfer from the plurality of pixels P may not be sufficient. In addition, when the gap 242G between the pillars 242 is relatively large (e.g., the gap 242G is greater than 10 μm), the pillars 242 may not have sufficient structural rigidity to support the plurality of pixels P. Similarly, when the width 242W of the pillars 242 is relatively small (e.g., the width 242W is less than 0.1 μm), the pillars 242 may not have sufficient structural rigidity to support the plurality of pixels P.

Figure 4:
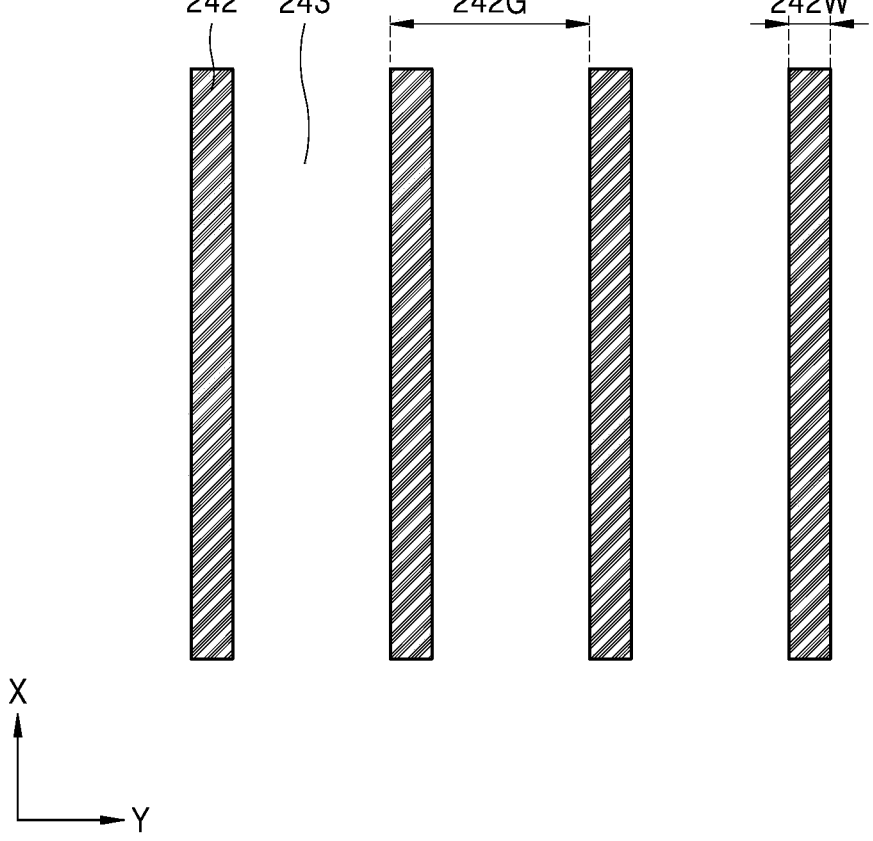
FIG. 4 is a schematic plan view of a plurality of pillars, according to an embodiment.

The pillars 242 may be entirely or partially in the form of stripes or gratings. FIG. 4 is a schematic plan view of an embodiment of the pillars 242. Referring to FIG. 4, the pillars 242 may have a stripe shape extending in the transverse direction (e.g., the X direction) and arranged in the Y direction. Accordingly, the void region 243 may be divided into a plurality of regions by the pillars 242. In an embodiment, the gap 242G between the pillars 242 and the width 242W of the pillars 242 may be appropriately determined considering the fill factor of the void region 243, the structural rigidity of the pillars 242, and the amount of heat transfer through the pillars 242. For example, the gap 242G between the pillars 242 may be about 1 μm to about 10 μm, and the width 242W of the pillars 242 may be about 0.1 μm to about 10 μm.

Each of the plurality of pixels P may include a lower reflective layer 210, an upper reflective layer 230, and a cavity layer 220. The upper reflective layer 230 may be a layer on which light is incident. The lower reflective layer 210 may be located below the upper reflective layer 230 and apart from the upper reflective layer 230. The cavity layer 220 may be arranged between the upper reflective layer 230 and the lower reflective layer 210. The refractive index of the cavity layer 220 may change according to an applied electrical signal (e.g., voltage). The term "cavity layer" may denote a layer formed by filling a cavity with a material, such as silicon (Si) or air. For instance, when the cavity layer is 220 filled with silicon, it may be referred to as a Si-filled cavity layer. The cavity layer is 220 may either be completely filled with a specific material or contain a space that is either in a vacuum state or filled with air. Additionally, the cavity layer may also be referred to as an active layer, including a material whose refractive index changes in response to an electrical signal, such as voltage or current, applied to it.

The lower reflective layer 210 may be arranged on the void block layer 240. For example, the lower reflective layer 210 may be arranged on the support layer 241 of the void block layer 240. The lower reflective layer 210 may reflect light toward the upper reflective layer 230. However, the present disclosure is not limited in this regard, and as such, the structure of the lower reflective layer 210 is not particularly limited. As illustrated in FIG. 2, the lower reflective layer 210 may be and/or may include a distributed Bragg reflector (DBR) in which at least one low refractive index material layer 210L and at least one high refractive index material layer 210H are alternately stacked. The material and thickness of each of the low refractive index material layer 210L and the high refractive index material layer 210H may be variously adjusted according to reflectance design conditions of the lower reflective layer 210. The high refractive index material layer 210H may include a material having a refractive index higher than a refractive index of the low refractive index material layer 210L. The high refractive index material layer 210H and the low refractive index material layer 210L may include different materials such as, but not limited to, silicon (Si), silicon nitride ($Si_3N_4$), silicon oxide ($SiO_2$), and titanium oxide ($TiO_2$). For example, the low refractive index material layer 210L may be and/or may include a silicon oxide ($SiO_2$) layer, and the high refractive index material layer 210H may be and/or may include a silicon (Si) layer. The high refractive index material layer 210H may have a thickness less than a thickness of the low refractive index material layer 210L. The thickness of each of the high refractive index material layer 210H and the low refractive index material layer 210L may be determined considering the wavelength of incident light, the refractive index of each layer, and the reflectance of the lower reflective layer 210. As a non-limiting example, when the wavelength of incident light is about 940 nm, the high refractive index material layer 210H may have a thickness of about 50 nm to about 90 nm, and the low refractive index material layer 210L may have a thickness of about 140 nm to about 180 nm.

The upper reflective layer 230 may be apart from the lower reflective layer 210 with the cavity layer 220 therebetween. That is, the lower reflective layer 210 may be arranged below the cavity layer 220, and the upper reflective layer 230 may be arranged above the cavity layer 220. In an embodiment, the upper reflective layer 230 may be a DBR in which at least one low refractive index material layer 230L and at least one high refractive index material layer 230H are alternately stacked. The material and thickness of each of the low refractive index material layer 230L and the high refractive index material layer 230H may be variously adjusted according to reflectance design conditions of the upper reflective layer 230. The high refractive index material layer 230H may include a material having a refractive index higher than a refractive index of the low refractive index material layer 230L. The high refractive index material layer 230H and the low refractive index material layer 230L may include different materials such as, but not limited to, silicon (Si), silicon nitride ($Si_3N_4$), silicon oxide ($SiO_2$), and titanium oxide ($TiO_2$). For example, the low refractive index material layer 230L may be and/or may include a silicon oxide ($SiO_2$) layer, and the high refractive index material layer 230H may be and/or may include a silicon (Si) layer. The high refractive index material layer 230H may have a thickness less than a thickness of the low refractive index material layer 230L. The thickness of each of the high refractive index material layer 230H and the low refractive index material layer 230L may be determined considering the wavelength of incident light, the refractive index of each layer, and the reflectance of the upper reflective layer 230. As a non-limiting example, when the wavelength of incident light is about 940 nm, the high refractive index material layer 230H may have a thickness of about 20 nm to about 90 nm, and the low refractive index material layer 230L may have a thickness of about 20 nm to about 180 nm.

The reflectance of the upper reflective layer 230 may be lower than the reflectance of the lower reflective layer 210. Accordingly, the phase of incident light may be controlled up to 360 degrees. To this end, the materials, thicknesses, and the like of the low refractive index material layers 210L and 230L and the high refractive index material layers 210H and 230H, which respectively form the lower reflective layer 210 and the upper reflective layer 230, may be determined to satisfy a condition that the reflectance of the upper reflective layer 230 be lower than the reflectance of the lower reflective layer 210. In an embodiment, the number of stacks of pairs of the low refractive index material layer 210L and the high refractive index material layer 210H in the lower reflective layer 210 may be greater than the number of stacks of pairs of the low refractive index material layer 230L and the high refractive index material layer 230H in the upper reflective layer 230. For example, the number of stacks of the lower reflective layer 210 may be three (3) or more, and the number of stacks of the upper reflective layer 230 may be two (2) or less. Although FIG. 2 illustrates a case where the number of stacks of the lower reflective layer 210 is three (3) and the number of stacks of the upper reflective layer 230 is two (2), the present disclosure is not limited thereto, and the number of stacks of the lower reflective layer 210 and the number of stacks of the upper reflective layer 230 may be variously changed so as to make the reflectance of the upper reflective layer 230 lower than the reflectance of the lower reflective layer 210.

The cavity layer 220 may be arranged between the lower reflective layer 210 and the upper reflective layer 230. The cavity layer 220 may resonate and amplify incident light between the lower reflective layer 210 and the upper reflective layer 230. The cavity layer 220 may include a material having a high thermo-optic coefficient. The thermo-optic coefficient may refer to a change in refractive index according to a temperature change of a material. For example, the cavity layer 220 may include silicon (Si). The cavity layer 220 may have a P-I-N structure, a P-I-P structure, and/or an N-I-N structure, where P may refer to a p-type semiconductor, I may refer to an intrinsic semiconductor, and N may refer to an n-type semiconductor. For example, when the cavity layer 220 includes silicon (Si), the P-I-N structure may be a p-type silicon (Si) (p-Si)/intrinsic silicon (Si) (i-Si)/n-type silicon (Si) (n-Si) structure, the P-I-P structure may be a p-Si/i-Si/p-Si structure, and the N-I-N structure may be an n-Si/i-Si/n-Si structure.

When an electrical signal is applied to the cavity layer 220 through an electrode and current is injected, Joule heat may be generated and the refractive index of the material (e.g., silicon (Si)) constituting the cavity layer 220 may change. Accordingly, the plurality of pixels P may form a phase profile. When light is incident on the cavity layer 220 through the upper reflective layer 230, the light may resonate between the lower reflective layer 210 and the upper reflective layer 230, the phase of the light may change, and the phase-changed light may be emitted. Consequently, by controlling the phase profile of the plurality of pixels P, beam steering may be performed to emit light incident on the spatial light modulator 100 in a desired direction.

Figures 5, 6:
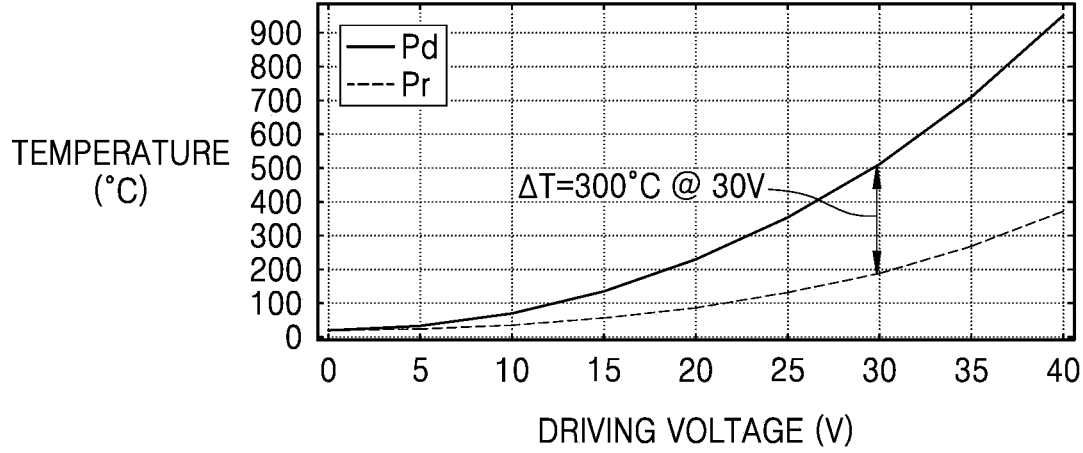
FIG. 5 is a graph showing a difference in refractive index of a material for forming a cavity layer, according to a temperature difference, according to an embodiment.
FIG. 6 shows results of a computer simulation of temperature of a pixel according to applied voltage when a void block layer is not applied, according to an embodiment.

The refractive index of the material for forming the cavity layer 220 may be affected by temperature. When the temperature of the cavity layer 220 is different from a target temperature, the refractive index of the cavity layer 220 may be different from a target refractive index. FIG. 5 is a graph showing the difference in refractive index of the material for forming the cavity layer 220 (e.g., silicon (Si)), according to a temperature difference. For example, when heat is generated in the material (e.g., silicon (Si)) constituting the cavity layer 220 of the driven pixel (e.g., driven pixel Pd of FIG. 2) to which an electrical signal is applied, the heat may be transferred to the substrate 200 through the lower reflective layer 210 that may have a relatively high heat transfer rate. Thus, the temperature of the driven pixel Pd may decrease. Consequently, the refractive index of the material (e.g., silicon (Si)) constituting the cavity layer 220 of the driven pixel Pd may be lower than the target refractive index. In addition, when heat is transferred along the substrate 200 to adjacent non-driven pixels (e.g., non-driven pixels Pr of FIG. 2) to which an electrical signal is not applied, the temperature of the non-driven pixels Pr may increase. Consequently, the difference in refractive index between the driven pixels Pd and the non-driven pixels Pr may be reduced. As such, the phase difference between the light reflected from the driven pixels Pd and the light reflected from the non-driven pixels Pr may be reduced, which may prevent obtaining a desired phase change. In consideration of heat loss, a voltage applied to the driven pixel Pd may be increased to inject a large amount of current into the pixel P, thereby increasing the amount of heat generated, as well as, the power consumption of the spatial light modulator 100.

According to an embodiment, the void regions 243 may be formed between the plurality of pixels P and the substrate 200. The void regions 243 may be substantially a vacuum. Accordingly, heat transfer from the plurality of pixels P (e.g., the driven pixels Pd) to the substrate 200 and from the substrate 200 to the non-driven pixels Pr by convection may be reduced, when compared to a related spatial light modulator. In addition, because the plurality of pixels P are supported by the pillars 242 having a minimum number and size, heat transfer from the driven pixel Pd to the substrate 200 and heat transfer from the substrate 200 to the non-driven pixel Pr by conduction through the pillars 242 may be reduced, when compared to a related spatial light modulator. Therefore, because the temperature of the cavity layer 220 may be changed to the target temperature even with a low driving voltage, the power consumption of the spatial light modulator 100 may be reduced, when compared to a related spatial light modulator. By extension, thermal crosstalk through the substrate 200 between the driven pixels Pd and the non-driven pixels Pr may be reduced, and thus, a spatial light modulator with stable phase modulation performance may be implemented.

In addition, a temperature difference between the driven pixel Pd and the non-driven pixel Pr may be increased even at a low driving voltage, and thus, emitted light may be focused at a desired position. Furthermore, the intensity of high-order beam or zero-order beam may be reduced, and thus, the output and efficiency of the spatial light modulator 100 may be improved. That is, the accuracy and efficiency of optical scanning and/or beam steering of the spatial light modulator 100 may be improved, when compared to a related spatial light modulator.

Referring again to FIG. 2, trenches 260 may each be provided between two adjacent pixels P. That is, the plurality of pixels P may be partitioned by the trenches 260. The trenches 260 may be substantially a vacuum. The trench 260 may be filled with a material with a low heat transfer rate (e.g., air). Accordingly, thermal independence between the driven pixel Pd and the non-driven pixel Pr may be improved, when compared to a related spatial light modulator. In an embodiment, the trench 260 may be formed to pass through the pixel P. That is, the trench 260 may be formed up to the top surface of the void block layer 240. Accordingly, thermal influence in the lateral direction between the adjacent pixels P may be reduced. In an embodiment, the trench 260 may pass through the pixel P and the void block layer 240 and extend up to the top surface of the substrate 200. Accordingly, the void block layers 240 may be partitioned on the pixel basis, and thermal influence in the lateral direction between the adjacent pixels P may be further reduced.

Figure 7:
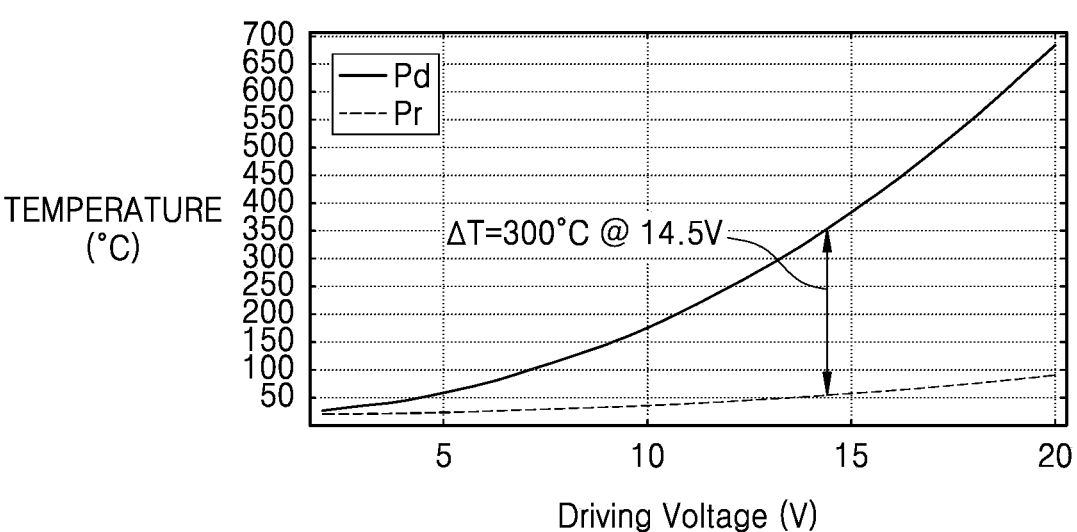
FIG. 7 shows results of a computer simulation of temperature of a pixel according to applied voltage when a void block layer is applied, according to an embodiment.

FIG. 6 shows results of a computer simulation of temperature of the pixel P according to the applied voltage when the void block layer 240 is not applied, according to an embodiment. In the computer simulation of FIG. 6, a trench having a width of 500 nm is applied. FIG. 7 shows results of a computer simulation of the pixel P according to the applied voltage when the void block layer 240 is applied, according to an embodiment. In the computer simulation of FIG. 7, the width of the trench is 500 nm, the thickness of the void region is 2 μm, the thickness of the pillar is 500 nm, and the gap between the pillars is 4 μm.

Referring to FIG. 6, a voltage of about 30 V is applied to the driven pixel Pd so that a temperature difference (ΔT) between the driven pixel Pd and the non-driven pixel Pr is about 300° C. Referring to FIG. 7, a voltage of about 14.5 V is applied to the driven pixel Pd so that a temperature difference (ΔT) between the driven pixel Pd and the non-driven pixel Pr is about 300° C. Accordingly, the spatial light modulator 100 to which the void block layer 240 is applied may be driven with a comparatively lower power consumption.

Figure 8:
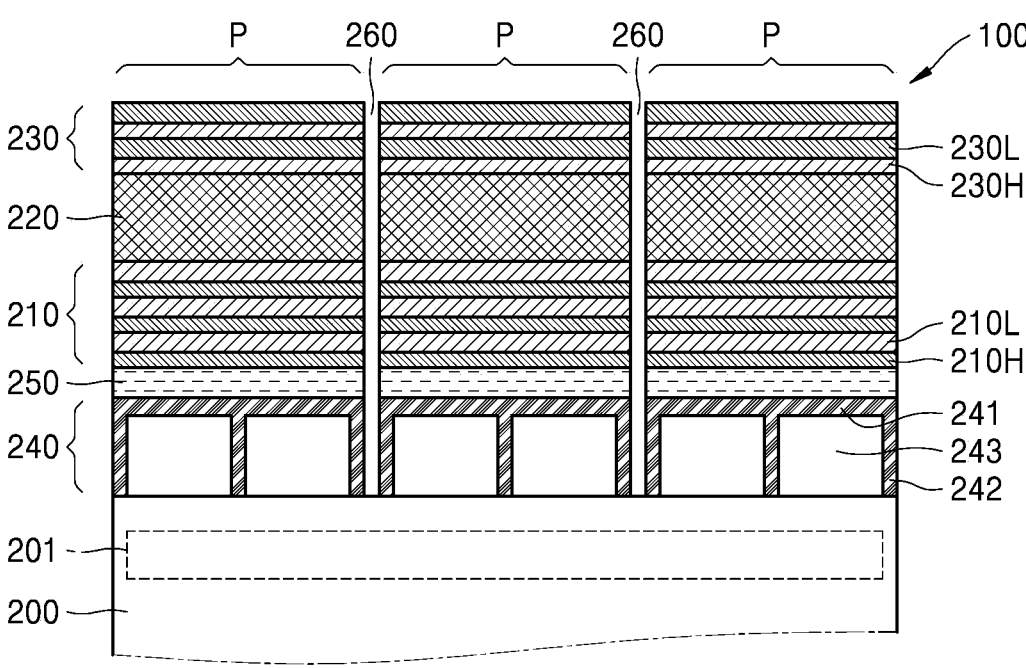
FIG. 8 is a schematic cross-sectional view of a spatial light modulator, according to an embodiment.

FIG. 8 is a schematic cross-sectional view of a spatial light modulator 100, according to an embodiment. The spatial light modulator 100 of FIG. 8 may include and/or may be similar in many respects to the spatial light modulator 100 described above with reference to FIGS. 1 to 7, and may include additional features not mentioned above. For example, the spatial light modulator 100 of FIG. 8 may include a planarization layer 250. Consequently, repeated descriptions of the spatial light modulator 100 described above with reference to FIGS. 1 to 7 may be omitted for the sake of brevity.

Referring to FIG. 8, the planarization layer 250 may be arranged between a void block layer 240 and a plurality of pixels P. The planarization layer 250 may prevent the curves of the void block layer 240 from being transferred to the plurality of pixels P. The planarization layer 250 may be formed on, for example, a support layer 241 of the void block layer 240. The planarization layer 250 may include the same material as a material of the void block layer 240. For example, the planarization layer 250 may include, but not be limited to, silicon oxide (SiO₂), silicon nitride (SiNₓ), or the like. Advantageously, the planarization layer 250 may increase the fill factor of void regions 243. The thickness of the planarization layer 250 may be greater than the thickness of the support layer 241 of the void block layer 240.

Figure 9:
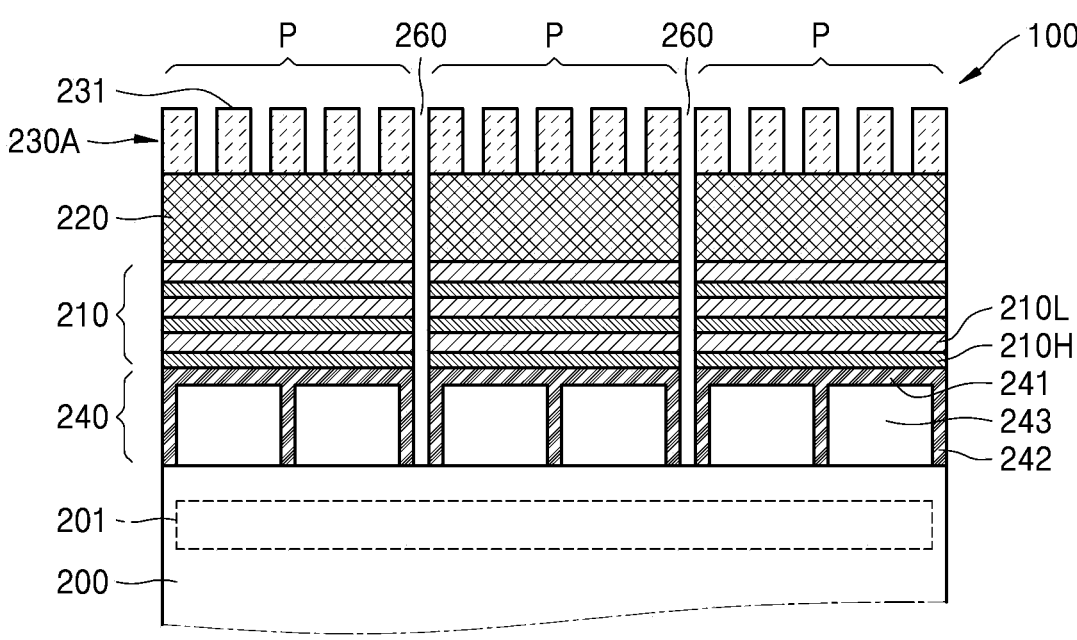
FIG. 9 is a schematic cross-sectional view of a spatial light modulator, according to an embodiment.

FIG. 9 is a schematic cross-sectional view of a spatial light modulator 100, according to an embodiment. The spatial light modulator 100 of FIG. 9 may include and/or may be similar in many respects to the spatial light modulator 100 described above with reference to FIGS. 1 to 8, and may include additional features not mentioned above. For example, the spatial light modulator 100 of FIG. 9 may include a high contrast grating (HCG) layer 230A, constituting an active meta surface, as an upper reflective layer. Consequently, repeated descriptions of the spatial light modulator 100 described above with reference to FIGS. 1 to 8 may be omitted for the sake of brevity.

Referring to FIG. 9, the HCG layer 230A acting as the upper reflective layer may be arranged on the cavity layer 220. The HCG layer 230A may form the active meta surface on the cavity layer 220. The HCG layer 230A may have a structure in which a plurality of grating elements 231 are periodically arranged on the top surface of the cavity layer 220. The grating elements 231 may have substantially similar and/or the same shape and dimensions. At least one of the height (e.g., thickness) and the width of each of the grating elements 231, and the period of the grating elements 231 may be less than the wavelength of incident light. By controlling the height (e.g., thickness) and the width of each of the grating elements 231, and/or the pitch of the grating elements 231, a desired reflectance may be obtained in a desired wavelength band. For example, the height and the width of each of the grating elements 231, and/or the pitch of the grating elements 231 may be designed such that the reflectance of the HCG layer 230A may be 70% or more. The grating elements 231 may be arranged one-dimensionally (1D). The arrangement period of the grating elements 231 may be less than the wavelength of incident light. As used herein, the HCG layer 230A may be referred to as an active meta surface or an active meta surface layer, and each of the grating elements 231 may be referred to as an active meta pattern or an active meta diffraction pattern. Each of the grating elements 231 may include a high refractive index material (e.g., silicon (Si)). In an embodiment, each of the grating elements 231 may include amorphous silicon (Si) and/or crystalline silicon (Si) (e.g., polycrystalline silicon), however the present disclosure is not limited thereto. For example, each of the grating elements 231 may include polycrystalline silicon having a relatively small grain size.

In an embodiment, a protective layer may be arranged between the cavity layer 220 and the HCG layer 230A. The protective layer may prevent peel-off from occurring during a process of annealing a cavity layer material (e.g., silicon (Si), silicon oxide (SiO₂), or the like) for generating Joule heat. The protective layer may include, but not be limited to, at least one of silicon oxide (SiO₂), silicon nitride (Si₃N₄), aluminum oxide (Al₂O₃), hafnium oxide (HfO₂), and titanium oxide (TiO₂). However, the present disclosure is not limited thereto, and the protective layer may include other materials. In an embodiment, the protective layer may have a thickness of about 20 nm to about 200 nm. However, the present disclosure is not limited in this regard.

The width of the trench 260 may be less than the period of the grating elements 231. The width of the trench 260 may be the same as or different from the width of the grating elements 231.

Figure 10:
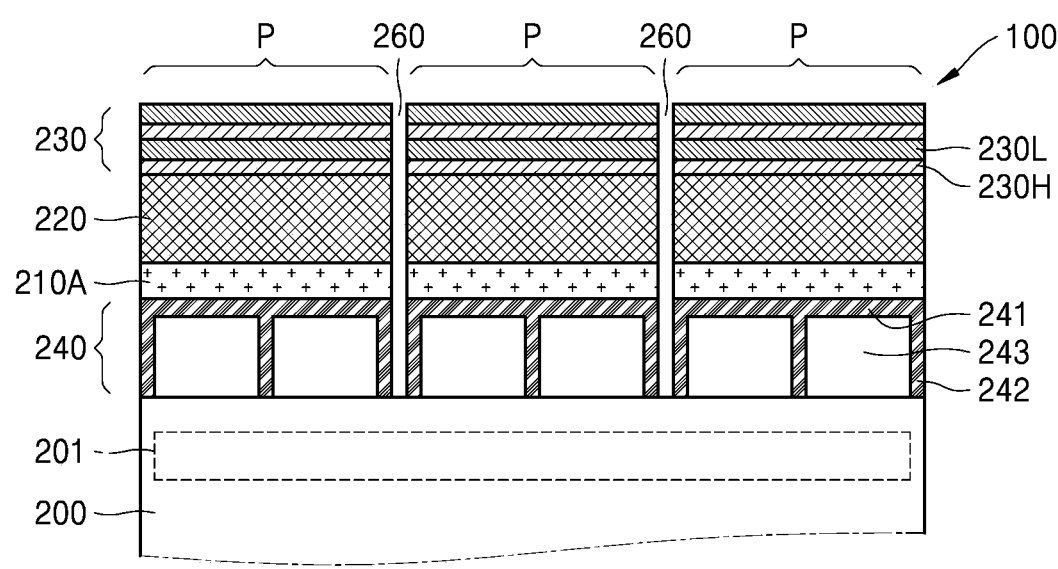
FIG. 10 is a schematic cross-sectional view of a spatial light modulator, according to an embodiment.

FIG. 10 is a schematic cross-sectional view of a spatial light modulator 100, according to an embodiment. The spatial light modulator 100 of FIG. 10 may include and/or may be similar in many respects to the spatial light modulator 100 described above with reference to FIGS. 1 to 9, and may include additional features not mentioned above. For example, the spatial light modulator 100 of FIG. 10 may include a metal mirror layer 210A as a lower reflective layer. Consequently, repeated descriptions of the spatial light modulator 100 described above with reference to FIGS. 1 to 9 may be omitted for the sake of brevity.

Referring to FIG. 10, the metal mirror layer 210A may be arranged on a void block layer 240. A cavity layer 220 and an upper reflective layer 230 may be sequentially arranged on the metal mirror layer 210A in this stated order. The metal mirror layer 210A may include a metal having a high reflectance, such as, but not limited to, copper (Cu), aluminum (Al), nickel (Ni), palladium (Pd), platinum (Pt), silver (Ag), gold (Au), or may include an alloy including at least one of copper (Cu), aluminum (Al), nickel (Ni), palladium (Pd), platinum (Pt), silver (Ag), gold (Au).

FIGS. 11A to 11I illustrate an embodiment of a method of fabricating the spatial light modulator 100. Referring to FIGS. 11A to 11I, the method of fabricating the spatial light modulator 100, according to an embodiment, may include forming a void block layer 240, a lower reflective layer 210, a cavity layer 220, and an upper reflective layer 230 on a substrate 200. The forming of the void block layer 240 may include forming a sacrificial layer 301 on the substrate 200, forming, in the sacrificial layer 301, a plurality of through-holes 303*a* exposing the surface of the substrate 200, forming a plurality of pillars 242 by filling the through-holes 303*a* with a support material, and forming void regions 243 by removing the sacrificial layer 301.

Figure 11A:
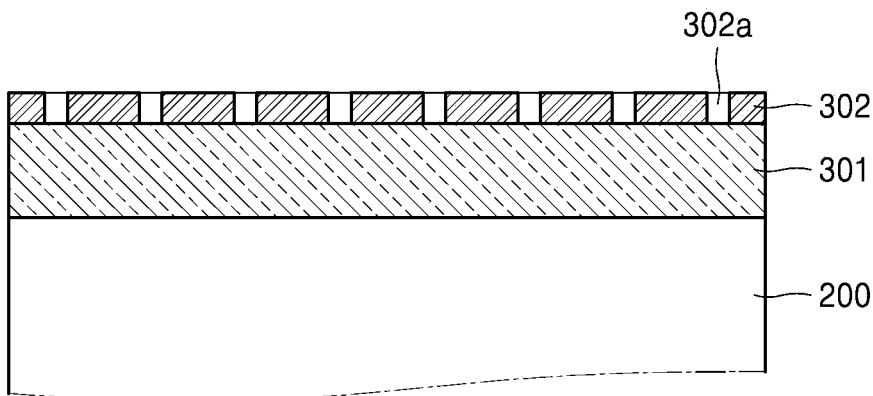
FIGS. 11A to 11I illustrate an embodiment of a method of fabricating the spatial light modulator, according to an embodiment.
Figure 11B:
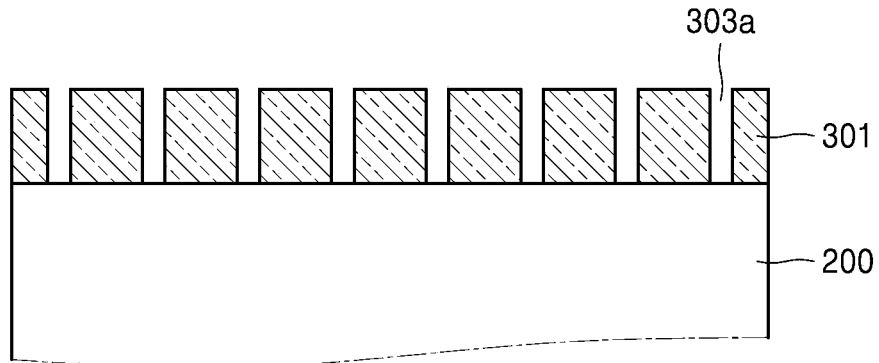

Referring to FIG. 11A, the substrate 200 may be prepared. The substrate 200 may be and/or may include a semiconductor substrate (e.g., a silicon substrate) and/or may be and/or may include a glass substrate. The sacrificial layer 301 may be formed on the substrate 200. The sacrificial layer 301 may be and/or may include, for example, an amorphous carbon layer (ACL). An etch mask layer 302 having etch holes 302*a* corresponding to regions where the pillars 242 are to be formed may be formed on the top surface of the sacrificial layer 301. When the etch mask layer 302 is removed after etching the sacrificial layer 301 through the etch holes 302*a*, the through-holes 303*a* may be formed in the sacrificial layer 301, as illustrated in FIG. 11B. The through-holes 303*a* may be formed to extend from the top surface of the sacrificial layer 301 to the top surface of the substrate 200. The surface of the substrate 200 (e.g., the top surface of the substrate 200) may be exposed through the through-holes 303*a*.

Figure 11C:
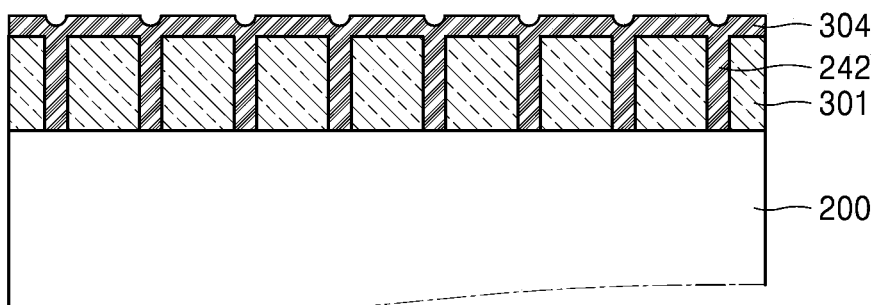

Subsequently, the through-holes 303*a* may be filled with a support material, such as, but not limited to, silicon oxide (SiO$_2$). Accordingly, as illustrated in FIG. 11C, the pillars 242 extending from the surface of the substrate 200 may be formed. Due to the support material, a first support material layer 304 may be formed on the surface of the sacrificial layer 301. This process may be performed by, for example, a plasma enhanced chemical vapor deposition (PECVD) process.

Figure 11D:
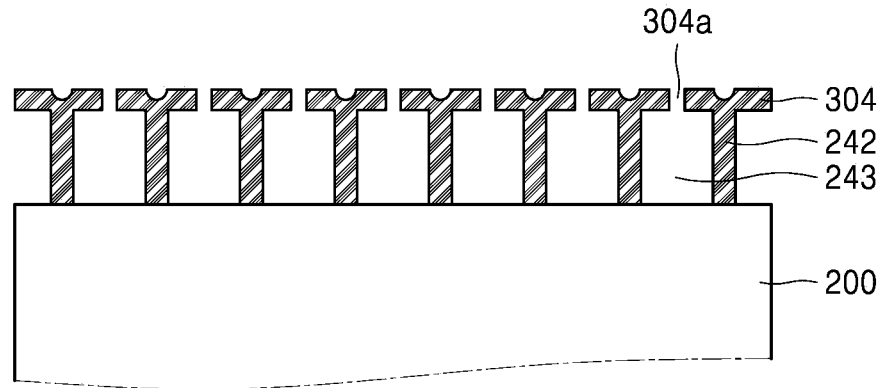
Figure 11E:
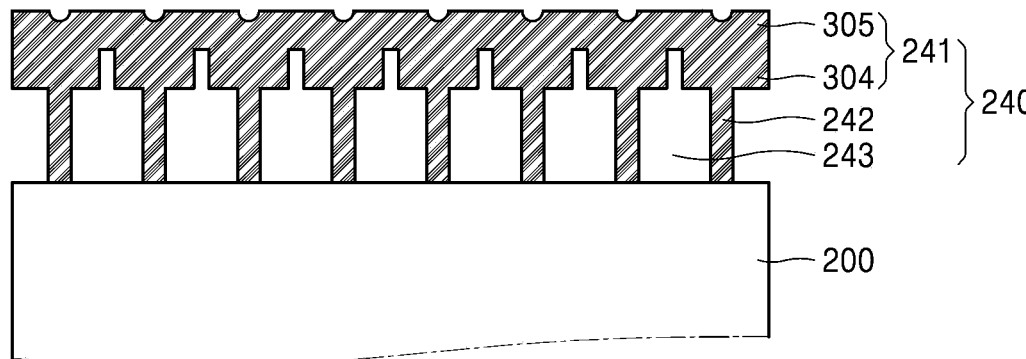

As illustrated in FIG. 11D, holes 304*a* may be formed in the first support material layer 304, and the sacrificial layer 301 may be removed by performing etching thereon through the holes 304*a*. The regions where the sacrificial layer 301 is removed may become the void regions 243. As illustrated in FIG. 11E, a second support material layer 305 may be formed by additionally depositing the support material (e.g., silicon oxide (SiO$_2$)) on the first support material layer 304. A support layer 241 may be formed by the first and second support material layers 304 and 305. Because the above-described processes are performed by a semiconductor process in a substantial vacuum environment, the void regions 243 may be substantially vacuum.

Figure 11F:
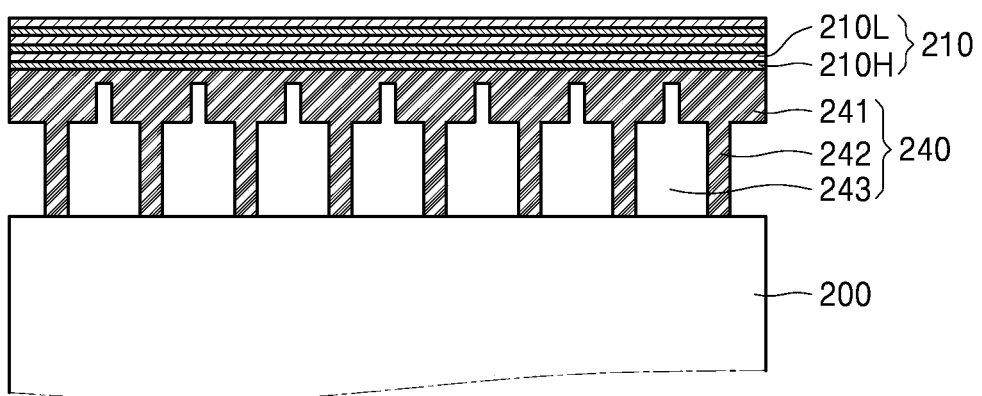

Referring to FIG. 11F, the lower reflective layer 210 may be formed on the support layer 241. In an embodiment, the lower reflective layer 210 may include a DBR. The lower reflective layer 210 may be formed by alternately stacking a low refractive index material layer 210L and a high refractive index material layer 210H. The high refractive index material layer 210H and the low refractive index material layer 210L may include different materials such as, but not limited to, silicon (Si), silicon nitride (Si$_3$N$_4$), silicon oxide (SiO$_2$), and titanium oxide (TiO$_2$). For example, the low refractive index material layer 210L may be and/or may include a silicon oxide (SiO$_2$) layer, and the high refractive index material layer 210H may be and/or may include a silicon (Si) layer. In an embodiment, the number of stacked pairs of the low refractive index material layer 210L and the high refractive index material layer 210H may be three (3) or more. However, the present disclosure is not limited in this regard. In an embodiment, the lower reflective layer 210 may be replaced with the metal mirror layer 210A as illustrated in FIG. 10. The metal mirror layer 210A may include a metal having a high reflectance, such as, but not limited to, copper (Cu), aluminum (Al), nickel (Ni), palladium (Pd), platinum (Pt), silver (Ag), gold (Au), or may include an alloy including at least one of copper (Cu), aluminum (Al), nickel (Ni), palladium (Pd), platinum (Pt), silver (Ag), gold (Au).

Figure 11G:
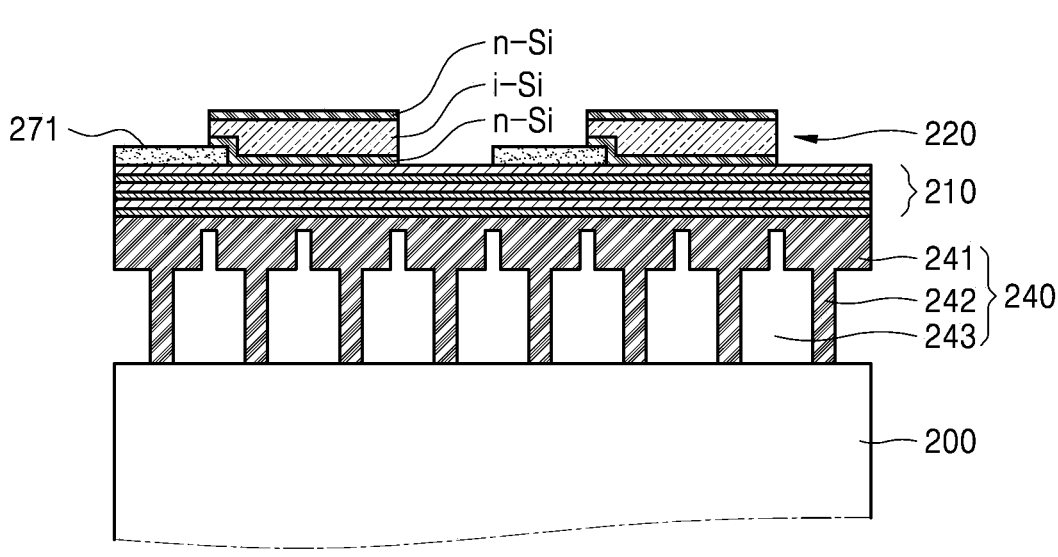

The cavity layer 220 may be formed on the lower reflective layer 210, as illustrated in FIG. 11G. The cavity layer 220 may include a refractive index change material. The refractive index change material may be a material having a high thermo-optic coefficient. For example, the refractive index change material may be silicon (Si). The cavity layer 220 may have a P-I-N structure, a P-I-P structure, and/or an N-I-N structure. In an embodiment, the cavity layer 220 may have an N-I-N structure, as shown in FIG. 11G. The cavity layer 220 may be formed by sequentially stacking an n-Si layer, an i-Si layer, and an n-Si layer on the lower reflective layer 210 in this stated order. An electrode 271 may be formed on the lower reflective layer 210, and the lowermost n-Si layer may be formed in contact with the electrode 271. The electrode 271 may include a transparent conductive oxide (TCO) having transmissive properties with respect to light in the operating wavelength range of the spatial light modulator 100, such as, but not limited to, indium tin oxide (ITO), indium tungsten oxide (IWO), indium zinc oxide (IZO), gallium-doped zinc oxide (GZO), gallium indium zinc oxide (GIZO), or aluminum-doped zinc oxide (AZO).

Figure 11H:
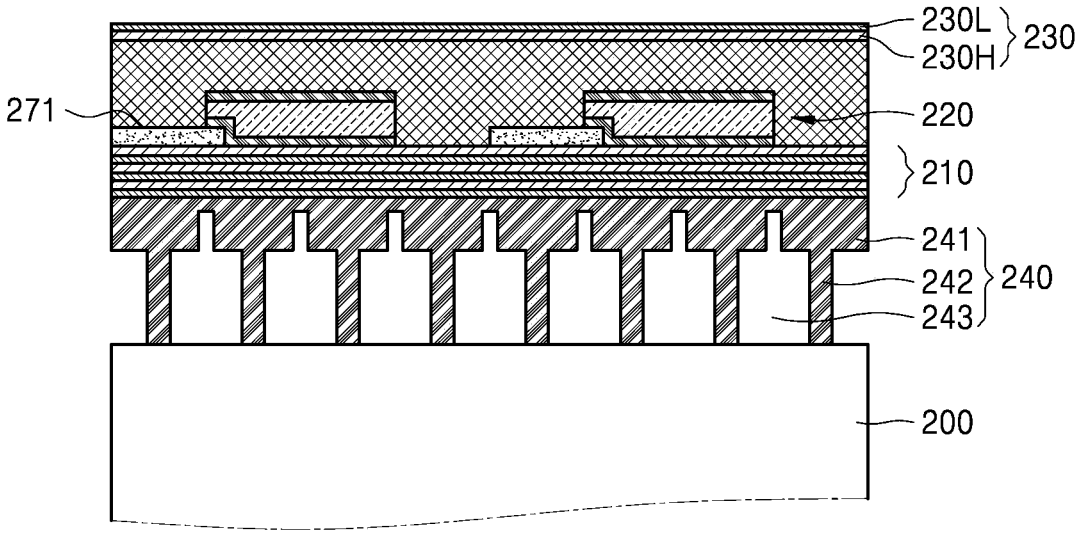

Referring to FIG. 11H, an upper reflective layer 230 may be formed on the cavity layer 220. Before forming the upper reflective layer 230, refractive index change layers formed by a refractive index change material (e.g., an N-I-N structure of silicon (Si)) and a transparent dielectric layer filling between the refractive index change layers may be formed. For example, the upper reflective layer 230 may include a DBR. The upper reflective layer 230 may be formed by alternately stacking a low refractive index material layer 230L and a high refractive index material layer 230H. The high refractive index material layer 230H and the low refractive index material layer 230L may include different materials such as, but not limited to, silicon (Si), silicon nitride (Si$_3$N$_4$), silicon oxide (SiO$_2$), and titanium oxide (TiO$_2$). For example, the low refractive index material layer 230L may be and/or may include a silicon oxide (SiO$_2$) layer, and the high refractive index material layer 230H may be and/or may include a silicon (Si) layer. The reflectance of the upper reflective layer 230 may be lower than the reflectance of the lower reflective layer 210. Consequently, the number of stacks of the upper reflective layer 230 may be less than the number of stacks of the lower reflective layer 210. For example, the number of stacks of the upper reflective layer 230 may be two (2) or less.

Figure 11I:
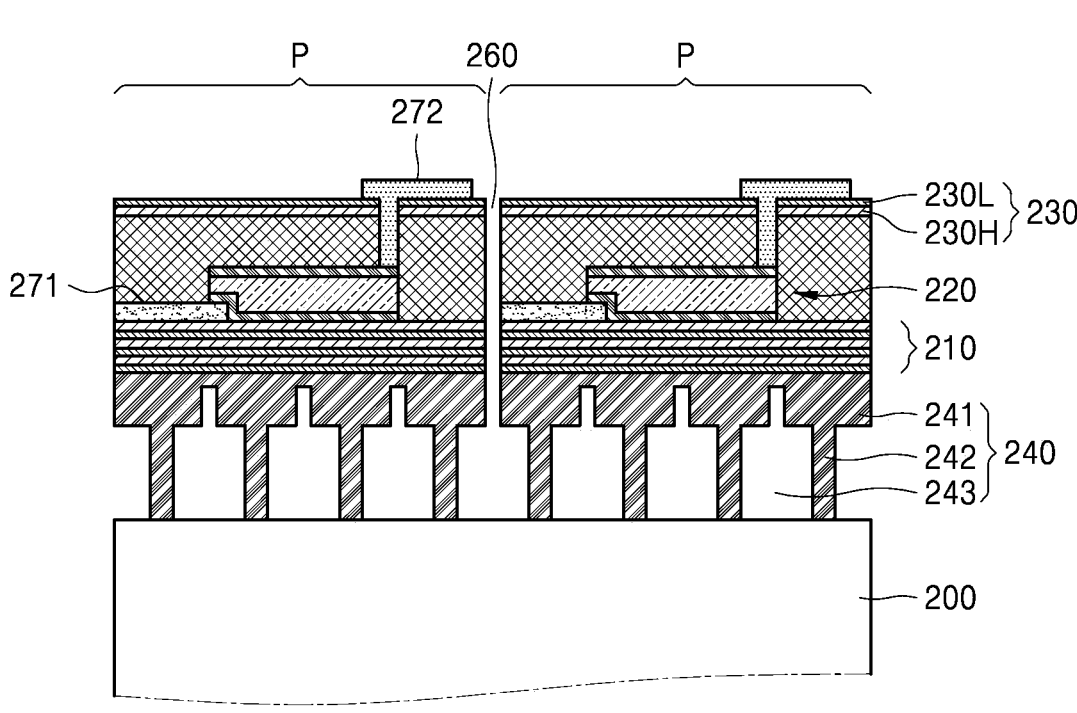

As shown in FIG. 11I, an electrode 272 may be formed in contact with the uppermost n-Si layer of the cavity layer 220. For example, the electrode 272 may be formed by forming through-holes extending from the upper reflective layer 230 to expose the uppermost n-Si layer and filling the through-holes with a TCO having transmissive properties with respect to light in the operating wavelength range of the spatial light modulator 100, such as, but not limited to, indium tin oxide (ITO), indium tungsten oxide (IWO), indium zinc oxide (IZO), gallium-doped zinc oxide (GZO), gallium indium zinc oxide (GIZO), or aluminum-doped zinc oxide (AZO). Subsequently, the trench 260 may be formed between two adjacent pixels P. The trench 260 may be formed through, for example, an etching process. The trench 260 may extend up to the top surface of the void block layer 240 and may pass through the void block layer 240 and extend up to the surface of the substrate 200.

According to the embodiment of the fabricating method described above, thermal crosstalk between driven pixels Pd and non-driven pixels Pr from among the plurality of pixels P may be reduced, and thus, a spatial light modulator 100 having a relatively large difference in refractive index between the driven pixels Pd and the non-driven pixels Pr with respect to the applied voltage and having a relatively low power consumption may be fabricated.

The spatial light modulator 100, according to various embodiments, may be applied to various electronic apparatuses, such as, but not limited to, a light detection and ranging (LiDAR) system, a beam steering system that steers incident light in a desired direction, or the like.

Figure 12:
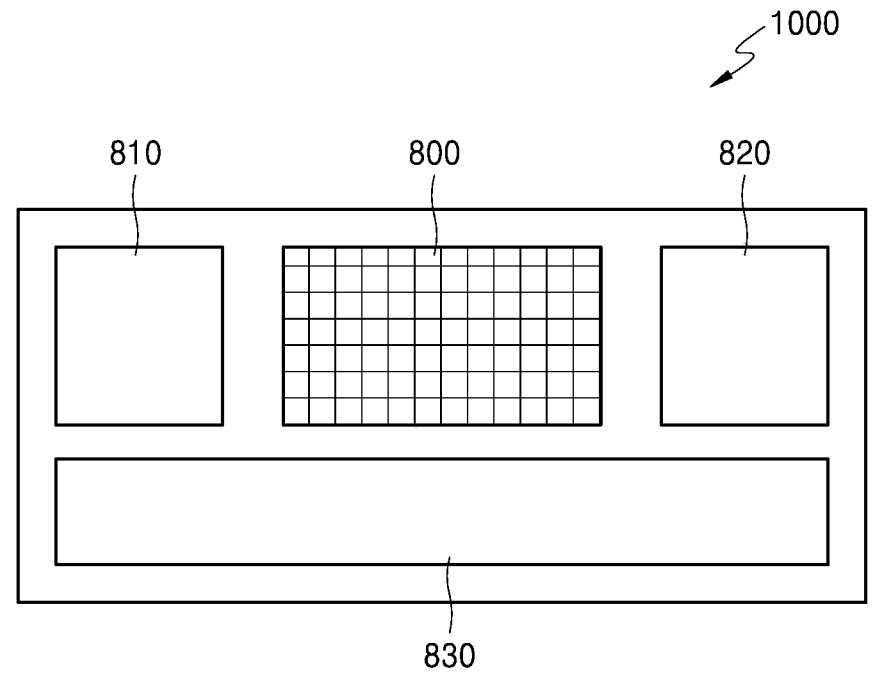
FIG. 12 schematically illustrates a beam steering system as an example of an electronic apparatus to which a spatial light modulator is applied, according to an embodiment.

The spatial light modulator 100, according to various embodiments, may be applied to a beam steering system that steers an incident laser beam in a desired direction. FIG. 12 illustrates a beam steering system 1000, according to an embodiment.

Referring to FIG. 12, the beam steering system 1000 may include a laser light source 810 that emits a laser beam having a wavelength, a spatial light modulator 800 that steers the incident laser beam, a detector 820 that detects the steered laser beam, and a driver 830. The driver 830 may include a driving circuit that drives the laser light source 810, the spatial light modulator 800, and the detector 820.

The laser light source may emit a laser beam having a wavelength of about 900 nm to about 1,000 nm. For example, a laser diode may be used as the laser light source 810. However, the present disclosure is not limited in this regard, and the laser light source may be implemented using other devices. The laser beam emitted from the laser light source 810 may be incident on the spatial light modulator 800. The spatial light modulator 800 may steer the laser beam in a desired direction by modulating the phase of the incident laser beam and emitting the phase-modulated incident laser beam. The spatial light modulator 800 may include and/or may be similar in many respects to the spatial light modulator 100 described above with reference to FIGS. 1 to 11I, and may include additional features not mentioned above. When the laser beam steered by the spatial light modulator 800 is irradiated onto and reflected from an object, the detector 820 may detect the reflected laser beam.

Figure 13:
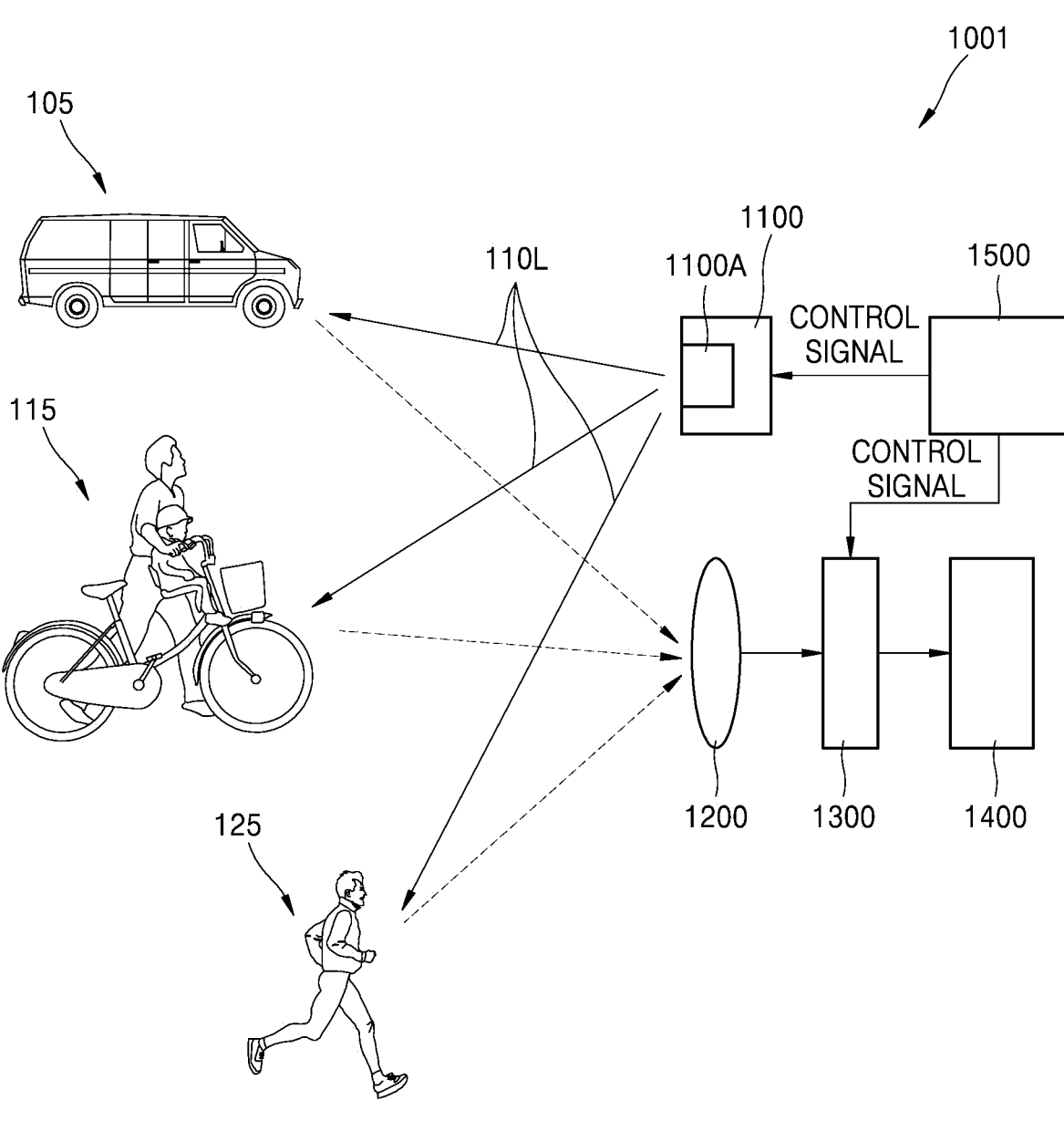
FIG. 13 schematically illustrates a light detection and ranging (LiDAR) system as an example of an apparatus to which a spatial light modulator is applied, according to an embodiment.

FIG. 13 schematically illustrates a LiDAR system 1001 as an example of an apparatus to which a spatial light modulator is applied, according to an embodiment.

Referring to FIG. 13, the LiDAR system 1001 may include a light source 1100A, a spatial light modulator 1100, a lens module 1200, an optical filter 1300, a detector 1400, and a controller 1500. When necessary for obtaining and processing information about a first subject 105, a second subject 115, and/or a third subject 125, the LiDAR system 1001 may further include other elements in addition to the aforementioned elements. The number and shape of the first to third subjects 105 to 125 are merely illustrative and are not intended to limit the present disclosure. That is, various types and quantities of objects may be subjects. Fixed or moving objects may also be subjects. Notably, the aspects presented herein may be employed with any object capable of reflecting light.

The light source 1100A may emit light of various wavelengths, for example, laser light, according to a light emission signal from the controller 1500. The light source 1100A may include, for example, a silicon (Si) photonics optical phased array (OPA) including a plurality of unit light sources (or cell light sources). The wavelength of light 110L emitted from the light source 1100A may be controlled by a control signal provided from the controller 1500. The spatial light modulator 1100 may act as an optical scanner that receives light emitted from the light source 1100A, steers the light in a desired direction, and irradiates the steered light onto the first to third subjects 105 to 125. The spatial light modulator 1100 may include and/or may be similar in many respects to the spatial light modulator 100 and the spatial light modulator 800 described above with reference to FIGS. 1 to 12, and may include additional features not mentioned above. In an embodiment, the spatial light modulator 1100 may include a plurality of spatial light modulators (e.g., the spatial light modulators 100 and/or the spatial light modulators 800). The light 110L emitted from the light source 1100A may be irradiated onto the first to third subjects 105 to 125 by the spatial light modulator 1100, be reflected from the first to third subjects 105 to 125, and be incident on the lens module 1200.

Although the lens module 1200 in FIG. 12 is illustrated as a single lens, the lens module 1200 may be and/or may include a lens optical system including a plurality of lenses that may converge incident light to the optical filter 1300. The light incident on the lens module 1200 may be converged by the lens module 1200 and be incident on the optical filter 1300.

The optical filter 1300 may pass only light of a specific wavelength and/or light in a specific band and block the remaining light. That is, the optical filter 1300 may be provided to actively filter light outside of a desired wavelength range. As such, the optical filter 1300 may include an active device that may pass only light of a specific center wavelength and blocks light of the other wavelengths in response to a control signal provided from the controller 1500. The control signal provided to the optical filter 1300 may include information about the center wavelength of the light to be passed through the active device. The center wavelength may correspond to the center wavelength of the light emitted from the light source 1100A.

As a result, the control signal provided to the optical filter 1300 may include a control signal that matches the center wavelength of the light emitted from the light source 1100A with the center wavelength of the light to be passed through the active device of the optical filter 1300. This control signal provided from the controller 1500 to the optical filter 1300 may be provided in real time together with the control signal provided from the controller 1500 to the light source 1100A. That is, the control of the wavelength of the light 110L emitted from the light source 1100A and the control of the center wavelength of the light to be passed through the active device of the optical filter 1300 may be performed in real time through the controller 1500. Consequently, the LiDAR system 1001, according to the embodiment, may scan the scan region including the first to third subjects 105 to 125 in real time.

The optical filter 1300 may selectively pass only desired light and block the other noise light, including natural light, using the active device included therein. Accordingly, a signal-to-noise ratio (SNR) of the LiDAR system 1001 may be increased. The active device of the optical filter 1300 may be and/or may include, but not limited to, a tunable band-pass filter. An operating method of the tunable band-pass filter may be and/or may include a liquid crystal method or an acousto-optic method.

The light having passed through the optical filter 1300 may be incident on the detector 1400. The detector 1400 may sense the light provided from the optical filter 1300 and obtain a variety of information about the first to third subjects 105 to 125 based on information included in the light. For example, the detector 1400 may detect time delay or phase difference information from the incident light and may obtain distance information about distances to the first to third subjects 105 to 125, position information of the first to third subjects 105 to 125, depth images of the first to third subjects 105 to 125, or the like, based on the time delay or phase difference information. In an embodiment, the detector 1400 may include a time-to-digital converter (TDC), an image sensor, or the like.

The controller 1500 may be arranged between the light source 1100A and the optical filter 1300. The controller 1500 may control the operations of the light source 1100A and the optical filter 1300. The controller 1500 may control the light source 1100A to emit light of a specific wavelength by transmitting a light emission start signal to the light source 1100A. That is, the controller 1500 may determine the wavelength of light to be emitted and may control the light source 1100A to emit light having the determined wavelength by transmitting, to the light source 1100A, a control signal including information about an electrical signal required for emitting light having the determined wavelength. By transmitting the light emission start signal to the light source 1100A and also transmitting the control signal to the optical filter 1300, the controller 1500 may control the optical filter 1300 so that the center wavelength of light transmission of the optical filter 1300 becomes the wavelength of the light emitted from the light source 1100A.

The spatial light modulator 100 may be applied to various electronic apparatuses, such as, but not limited to, a three-dimensional (3D) depth camera, a depth sensor, or a 3D sensor, which may obtain distance information for each direction. The embodiments described above are only non-limiting examples of the present disclosure, and various modifications may be made thereto by those of ordinary skill in the art.

According to aspects of the present disclosure, the void regions of the spatial light modulators may prevent heat generated in the cavity layer from being transferred to the substrate. Accordingly, a decrease in temperature due to heat loss of the driven pixel and a decrease in refractive index resulting therefrom may be prevented and/or reduced. In addition, compared to a case where the void regions are not provided, the pixels may be driven with a relatively low driving voltage, which may reduce the power consumption of the spatial light modulator, when compared to a related spatial light modulator.

It is to be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it is to be understood by those of ordinary skill in the art that various changes in form and details may be made therein without departing from the spirit and scope as defined by the following claims.

What is claimed is:

1. A spatial light modulator for modulating a phase of incident light and emitting phase-modulated light, the spatial light modulator comprising:

a substrate;

a plurality of pixels, each pixel of the plurality of pixels comprising:

an upper reflective layer;

a lower reflective layer; and a cavity layer disposed between the upper reflective layer and the lower reflective layer and having a refractive index that changes based on an electrical signal; and a void block layer comprising:

a plurality of pillars supporting the plurality of pixels and separating the plurality of pixels from the substrate; and void regions formed between the substrate and the plurality of pixels.

2. The spatial light modulator of claim 1, wherein the void regions are substantially a vacuum.

3. The spatial light modulator of claim 1, wherein the void block layer further comprises a support layer apart from the substrate and supporting the plurality of pixels, and wherein the plurality of pillars are disposed between the substrate and the support layer.

4. The spatial light modulator of claim 1, wherein each of the void regions has a thickness of 1 micrometer (μm) to 10 μm.

5. The spatial light modulator of claim 1, wherein a gap between the plurality of pillars is 1 micrometer (μm) to 10 μm.

6. The spatial light modulator of claim 1, wherein each of the plurality of pillars has a width of 0.1 micrometer (μm) to 1 μm.

7. The spatial light modulator of claim 1, further comprising:

a planarization layer disposed between the plurality of pixels and the void block layer.

8. The spatial light modulator of claim 7, wherein the void block layer further comprises a support layer apart from the substrate and the plurality of pillars, wherein the plurality of pillars is arranged between the substrate and the support layer, and wherein the planarization layer is disposed on the support layer.

9. The spatial light modulator of claim 7, wherein the planarization layer and the void block layer comprise a same material.

10. The spatial light modulator of claim 1, further comprising:

a trench formed between two adjacent pixels of the plurality of pixels.

11. The spatial light modulator of claim 10, wherein the trench passes through the void block layer.

12. The spatial light modulator of claim 1, wherein the lower reflective layer comprises at least one of a metal mirror layer or a distributed Bragg reflector.

13. The spatial light modulator of claim 1, wherein the upper reflective layer comprises a distributed Bragg reflector.

14. The spatial light modulator of claim 1, wherein the upper reflective layer comprises a high contrast grating (HCG) layer.

15. A method of fabricating a spatial light modulator, the method comprising:

sequentially forming, on a substrate, a void block layer, a lower reflective layer, a cavity layer, and an upper reflective layer, wherein the forming of the void block layer comprises:

forming a sacrificial layer on the substrate;

forming a plurality of through-holes exposing a surface of the substrate by etching the sacrificial layer;

forming a plurality of pillars by filling the plurality of through-holes with a support material; and removing the sacrificial layer.

16. The method of claim 15, wherein the forming of the void block layer further comprises:

at least partially covering a surface of the sacrificial layer by forming the support material; and forming, on the surface of the sacrificial layer, a first support material layer supported on the substrate by the plurality of pillars.

17. The method of claim 16, wherein the removing of the sacrificial layer comprises:

forming a hole in the first support material layer and removing the sacrificial layer by etching the sacrificial layer through the hole.

18. The method of claim 17, wherein the forming of the void block layer further comprises:

forming a second support material layer on the first support material layer; and forming a support layer supporting the lower reflective layer by forming the first support material layer and the second support material layer.

19. The method of claim 18, wherein the first support material layer and the second support material layer comprise a same material.

20. An electronic apparatus, comprising:

a light source configured to emit light of a wavelength; and a spatial light modulator configured to modulate a phase of light incident from the light source and emit phase-modulated light, wherein the spatial light modulator comprises:

a substrate;

a plurality of pixels, each pixel of the plurality of pixels comprising:

an upper reflective layer;

a lower reflective layer; and a cavity layer disposed between the upper reflective layer and the lower reflective layer and having a refractive index that changes based on an electrical signal; and a void block layer comprising:

a plurality of pillars supporting the plurality of pixels and separating the plurality of pixels from the substrate; and void regions formed between the substrate and the plurality of pixels.

* * * * *